(12) United States Patent
Feng (10) Patent No.: US 11,496,567 B2
(45) Date of Patent: Nov. 8, 2022

(54) DATA PROCESSING METHOD, APPARATUS, DEVICE AND STORAGE MEDIUM BASED ON UNMANNED VEHICLE (71) Applicant: APOLLO INTELLIGENT DRIVING TECHNOLOGY (BEIJING) CO., LTD., Beijing (CN)

(72) Inventor: Yan Feng, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 41 days.

(21) Appl. No.: 16/726,898

(22) Filed: Dec. 25, 2019

(65) Prior Publication Data
US 2020/0213397 A1 Jul. 2, 2020

(30) Foreign Application Priority Data
Dec. 26, 2018 (CN) .......................... 201811598094.1

(51) Int. Cl.
H04L 67/12 (2022.01)
H04L 67/1097 (2022.01)
(Continued)

(52) U.S. Cl.
CPC ............ *H04L 67/12* (2013.01); *B64C 39/024* (2013.01); *H04L 41/14* (2013.01); *H04L 67/1097* (2013.01); *B64C 2201/122* (2013.01)

(58) Field of Classification Search
CPC ..... G06K 17/0022; H04L 67/12; H04L 41/14; H04L 67/34; G07C 5/006; G07C 5/008;
(Continued)

(56) References Cited

U.S. PATENT DOCUMENTS 6,188,995 B1 * 2/2001 Garst .................... G06F 9/468
380/201
7,620,068 B2 * 11/2009 Stultz ................... H04J 3/1682
370/537
(Continued)

FOREIGN PATENT DOCUMENTS

CN 102567297 A 7/2012
CN 103425497 A 12/2013
(Continued)

OTHER PUBLICATIONS

John Kneuer, "In-Service Data Program Helps Boeing Design, Build, and Support Airplanes", The Boeing Company, Aero Quarterly Article, 2008, p. 16-21, retrieved online from https://www.boeing.com/commercial/aeromagazine/articles/qtr_1_08/article_03_1.html (Year: 2008).*
(Continued)

*Primary Examiner* — Kamal B Divecha
*Assistant Examiner* — Sandarva Khanal
(74) *Attorney, Agent, or Firm* — Dilworth IP, LLC (57) ABSTRACT A data processing method based on an unmanned vehicle, the method including acquiring data generated in an unmanned vehicle operating environment of the unmanned vehicle and type information of the unmanned vehicle operating environment; acquiring a data transformation logic corresponding to the type information from a pre-stored adaption repository, which stores data transformation logics corresponding to different type information; and transforming a data structure of the data according to the data transformation logic corresponding to the type information to obtain data in compliance with a preset data structure. By transforming data generated in different unmanned vehicle operating environments into data in compliance with the preset data structure, the cloud server can be assisted in analyzing and consistently processing the data in
(Continued)

compliance with the preset data structure after they have been transmitted to the cloud server, thus improving the data processing efficiency.

5 Claims, 3 Drawing Sheets

(51) Int. Cl.
*B64C 39/02* (2006.01)
*H04L 41/14* (2022.01)

(58) Field of Classification Search
CPC ... G07C 5/0841; G06F 40/151; G06F 40/166; G08G 5/0013; G08G 5/0091; B64C 2201/122; B64C 2201/14; B64C 39/024; H04W 4/44
See application file for complete search history.

(56) References Cited

U.S. PATENT DOCUMENTS

| | | | |
|---|---|---|---|
| 8,620,816 B2 | 12/2013 | Grim, III et al. | |
| 9,292,563 B1* | 3/2016 | Engberg | G06F 16/84 |
| 10,498,955 B2* | 12/2019 | Nadler | H04N 5/23238 |
| 10,666,712 B1* | 5/2020 | Dandekar | H04L 67/12 |
| 11,037,187 B2* | 6/2021 | Ericson | G06Q 30/0633 |
| 2009/0112388 A1* | 4/2009 | Yeager | G09B 19/16 701/23 |
| 2009/0216390 A1* | 8/2009 | Smith | H04L 69/08 701/2 |
| 2015/0339930 A1* | 11/2015 | Mccann | G08G 5/006 701/528 |
| 2016/0253849 A1* | 9/2016 | Kwak | G07C 5/008 701/31.5 |
| 2016/0292403 A1* | 10/2016 | Gong | G08G 5/0082 |
| 2016/0378089 A1* | 12/2016 | Lehofer | G05B 19/402 |
| 2017/0359317 A1* | 12/2017 | Anderson | H04L 63/061 |
| 2017/0361927 A1 | 12/2017 | Lavagen et al. | |
| 2019/0340940 A1* | 11/2019 | Elkabetz | G01W 1/02 |
| 2020/0137142 A1* | 4/2020 | Salles | H04L 67/327 |

FOREIGN PATENT DOCUMENTS

| | | | | |
|---|---|---|---|---|
| CN | 104753551 A | 7/2015 | | |
| CN | 106681250 A | 5/2017 | | |
| CN | 106850728 A | 6/2017 | | |
| CN | 107483553 A | 12/2017 | | |
| CN | 107564280 A | 1/2018 | | |
| CN | 107770740 A | 3/2018 | | |
| CN | 107850894 A | 3/2018 | | |
| CN | 108426581 A | 8/2018 | | |
| EP | 2477107 A1 | 7/2012 | | |
| EP | 2908203 B1 * | 3/2019 | | G06Q 10/06 |
| KR | 20170094877 A | 8/2017 | | |
| WO | 2014035539 A1 | 3/2014 | | |
| WO | WO-2019127229 A1 * | 7/2019 | | H04W 4/06 |

OTHER PUBLICATIONS

Glasgow et al., "Optimizing Information Value: Improving Rover Sensor Data Collection", IEEE Transactions On Systems, Man, And Cybernetics—Part A: Systems And Humans, vol. 28, No. 3, p. 593-604 May 2008. Downloaded on Apr. 23, 2021 at 15:49:29 UTC from IEEE Xplore (Year: 2008).*

Uma D. Ferrell, "Mindful Application of Standards for Avionics—An Intentional, Systematic, and Measurable Transformation", IEEE, Sep. 23-27, 2018. Downloaded on Apr. 22, 2021 at 18:01:21 UTC from IEEE Xplore. (Year: 2018).*

Barbatei et al. (Acquisition and relaying of data from a floating wireless sensor node using an UAV', IEEE, 2015 International Conference on Unmanned Aircraft Systems (ICUAS), p. 677-686, Jun. 9-12, 2015 (Year: 2015).*

Jane Wells, "Windows for drones? One start-up is dreaming big", CNBC Defense, Jan. 15, 2014, Retrieved online on Aug. 4, 2021 from https://www.cnbc.com/2014/01/15/drone-operating-systems-dreamhammer-wants-to-make-drone-os.html (Year: 2014).*

Blasch et al., "Joint Data Management for MOVINT Data-to-Decision Making", 2011 IEEE, Downloaded on Aug. 18, 2022 from IEEE Xplore. (Year: 2011).*

Prosvirin et al., "Model-Based Solution and Software Engineering Environment for UAV Critical Onboard Applications", 2015 IEEE, Downloaded on Aug. 18, 2022 from IEEE Xplore. (Year: 2015).*

Owen et al., "Addressing the drone data collection process for the Required data quality", 2016 IEEE, Downloaded on Aug. 18, 2022 from IEEE Xplore. (Year: 2016).*

First Office Action issued in Chinese Patent Application No. 201811598094.1. dated Jul. 16, 2020, 6 pages.

Second Office Action in CN Patent Application No. 201811598094.1 dated May 12, 2021.

Notice of Allowance in CN Patent Application No. 201811598094.1 dated Jan. 26, 2022.

* cited by examiner

DATA PROCESSING METHOD, APPARATUS, DEVICE AND STORAGE MEDIUM BASED ON UNMANNED VEHICLE

CROSS-REFERENCE TO RELATED DISCLOSURES

This application claims priority to Chinese Application No. CN 201811598094.1, filed on Dec. 26, 2018, which is hereby incorporated by reference in its entirety.

TECHNICAL FIELD

The present disclosure relates to the field of unmanned vehicle technologies and, in particular, to a data processing method, apparatus, device and storage medium based on an unmanned vehicle.

BACKGROUND

With the development of automotive technologies, the unmanned vehicle has been applied and developed. The unmanned vehicle is provided with an unmanned vehicle operating environment. There are several different unmanned vehicle operating environments at present, yet the differences between interfaces for calling different operating environments are significant. For example, an unmanned vehicle 1 may be provided with an unmanned vehicle operating environment A while an unmanned vehicle 2 may be provided with an unmanned vehicle operating environment B. The unmanned vehicle operating environment may also be referred to as an unmanned vehicle operating system.

In prior art, a data collecting unit in an unmanned vehicle can collect data generated in an unmanned vehicle operating environment, and transmit the data to a cloud server. The cloud server processes the data, and further performs a simulation to recover the actual driving scenario that the unmanned vehicle is in, thereby facilitating the optimization of an unmanned vehicle driving algorithm.

However, in prior art, data generated in different unmanned vehicle operating environments may be in different formats, preventing the cloud server from consistently analyzing and processing data generated in different unmanned vehicle operating environments.

SUMMARY

The embodiments of the present disclosure provides a data processing method, apparatus, device and storage medium based on an unmanned vehicle to solve the problem in the above solution where data generated in different unmanned vehicle operating environments may be in different formats, preventing the cloud server from consistently analyzing and processing data generated in different unmanned vehicle operating environments.

In a first aspect, the present disclosure provides a data processing method based on an unmanned vehicle, which is applicable in the unmanned vehicle, the method including:
acquiring data generated in an unmanned vehicle operating environment of the unmanned vehicle and type information of the unmanned vehicle operating environment;
acquiring a data transformation logic corresponding to the type information from a pre-stored adaption repository, wherein the adaption repository stores data transformation logics corresponding to different type information; and
transforming a data structure of the data according to the data transformation logic corresponding to the type information to obtain data in compliance with a preset data structure.

In a possible implementation, after the transforming a data structure of the data according to the data transformation logic corresponding to the type information to obtain data in compliance with a preset data structure, the method further includes:
transmitting the data in compliance with the preset data structure to a cloud server.

In a possible implementation, the transmitting the data in compliance with the preset data structure to a cloud server includes:
performing data processing to the data in compliance with the preset data structure to derive processed data; and
transmitting the processed data to the cloud server.

In a possible implementation, the performing data processing to the data in compliance with the preset data structure to derive processed data includes:
scheduling the data in compliance with the preset data structure into parallel threads for the data processing to derive the processed data.

In a possible implementation, the type information is an identification of the unmanned vehicle operating environment.

In a possible implementation, the acquiring type information of the unmanned vehicle operating environment includes:
acquiring data structure information of the data generated in the unmanned vehicle operating environment; and
identifying type information corresponding to the data structure information according to a predefined corresponding relationship between data structure information and type information to derive the type information of the unmanned vehicle operating environment.

In a possible implementation, the acquiring type information of the unmanned vehicle operating environment includes:
acquiring data structure information of the data generated in the unmanned vehicle operating environment; and
recognizing the data structure information using a pre-configured recognition model to derive the type information of the unmanned vehicle operating environment.

In a possible implementation, for data generated in different unmanned vehicle operating environments, the data structures of the obtained data that is in compliance the preset data structure are the same.

In a second aspect, the present disclosure provides a data processing method based on an unmanned vehicle, which is applicable in the unmanned vehicle, the apparatus including:
a first acquiring module, configured to acquire data generated in an unmanned vehicle operating environment of the unmanned vehicle and type information of the unmanned vehicle operating environment;
a second acquiring module, configured to acquire a data transformation logic corresponding to the type information from a pre-stored adaption repository, wherein the adaption repository stores data transformation logics corresponding to different type information; and
a transforming module, configured to transform a data structure of the data according to the data transformation logic corresponding to the type information to obtain data in compliance with a preset data structure.

In a possible implementation, the apparatus further includes:

a transmitting module, configured to transmit the data in compliance with the preset data structure to a cloud server.

In a possible implementation, the transmitting module includes:

a processing unit, configured to perform data processing to the data in compliance with the preset data structure to derive processed data; and a transmitting unit, configured to transmit the processed data to the cloud server.

In a possible implementation, the processing unit is specifically configured to:

schedule the data in compliance with the preset data structure into parallel threads for the data processing to derive the processed data.

In a possible implementation, the type information is an identification of the unmanned vehicle operating environment.

In a possible implementation, the first acquiring module includes:

a first acquiring unit, configured to acquire data structure information of the data generated in the unmanned vehicle operating environment;

a determining unit, configured to identify type information corresponding to the data structure information according to a predefined corresponding relationship between data structure information and type information to derive the type information of the unmanned vehicle operating environment.

In a possible implementation, the first acquiring module includes:

a second acquiring unit, configured to acquire data structure information of the data generated in the unmanned vehicle operating environment; and a recognizing unit, configured to recognize the data structure information using a preconfigured recognition model to derive the type information of the unmanned vehicle operating environment.

In a possible implementation, for data generated in different unmanned vehicle operating environments, the data structures of the obtained data that is in compliance with the preset data structure are the same.

In a third aspect, the present disclosure provides a control device, including: a memory and a processor, wherein the memory is configured to store computer instructions; and the processor is configured to execute the computer instructions stored in the memory to implement the data processing method based on an unmanned vehicle according to any implementation of the above first aspect.

A fourth aspect of the present disclosure provides a storage medium, including: a readable storage medium; and computer instructions which are stored in the readable storage medium and are configured to implement the data processing method based on an unmanned vehicle according to any implementation of the above first aspect.

According to the data processing method, apparatus, device and storage medium based on an unmanned vehicle provided in embodiments of the present disclosure, data generated by the unmanned vehicle in the unmanned vehicle operating environment and type information of the unmanned vehicle operating environment are acquired, then a data transformation logic corresponding to the type information is acquired from a pre-stored adaption repository. Further, a data structure of the data is transformed to derive data in compliance with a preset data structure according to the data transformation logic corresponding to the type information. It can be seen that, by transforming data generated in various unmanned vehicle operating environments into data in compliance with the preset data structure according to data transformation logics corresponding to various type information of the unmanned vehicle operating environments and processing the data in compliance with the preset data structures, data processing can be facilitated for different types of unmanned vehicle operating environments, thereby saving the code developing workload significantly and improving the code developing efficiency. Moreover, by transforming the data generated in the unmanned vehicle operating environments into the data in compliance with the preset data structure, the cloud server can consistently analyze and process various data in compliance with the preset data structure after the data in compliance with the preset data structure have been transmitted to the cloud server, so that the data processing efficiency can be improved.

BRIEF DESCRIPTION OF DRAWINGS

In order to illustrate the technical solutions in the embodiments of the present disclosure or prior art more clearly, the following will briefly introduce the drawings to be used in describing the embodiments or the prior art. Obviously, the drawings described below are only some embodiments of the present disclosure, and those skilled in the field may still derive other drawings from these drawings without paying any creative labor.

DESCRIPTION OF EMBODIMENTS

In order to make the objectives, technical solutions and advantages of the embodiments of the present disclosure clearer, the technical solutions in the embodiments of the present disclosure will now be clearly and completely described in conjunction with the drawings in the embodiments of the present disclosure. Apparently, the described embodiments are only some rather than all of the embodiments of the present disclosure. All other embodiments obtained by a person of ordinary skill in the art based on the embodiments of the present disclosure without paying creative labor shall fall within the scope of the present disclosure.

First of all, the disclosure scenarios of the embodiments of the present disclosure will be introduced.

The data processing method, apparatus, device and storage medium based on an unmanned vehicle provided in the embodiments of the present disclosure can be applied in disclosure scenarios of unmanned vehicle data collection. By transforming the data generated in different unmanned vehicle operating environments into data in compliance with a preset data structure and transferring the data to a cloud server, the cloud server can consistently analyze and process the data, thereby improving a data processing efficiency. Meanwhile, it can be applied to data processing in different types of unmanned vehicle operating environments, thus significantly conserving code developing workloads and improving a code developing efficiency.

The executive entity of the data processing method based on an unmanned vehicle provided in the embodiments of the present disclosure can be an apparatus or control device (for ease of description, this embodiment will be illustrated by way of example using the data processing apparatus based on an unmanned vehicle as the executive entity). Illustratively, the apparatus or the control device can be implemented by software and/or hardware.

Illustratively, the control device in the embodiments of the present disclosure may include but is not limited to a controller of an unmanned vehicle.

Typically, an unmanned vehicle is provided with an unmanned vehicle operating environment (or an unmanned vehicle operating system). There are several different unmanned vehicle operating environments at present, yet the differences between interfaces for calling different operating environments are significant. For example, an unmanned vehicle 1 may be provided with an unmanned vehicle operating environment A while an unmanned vehicle 2 may be provided with an unmanned vehicle operating environment B.

In prior art, by respectively developing respective codes for the data structures of data generated in different unmanned vehicle operating environments, data processing is implement in the unmanned vehicle. The processed data is transmitted to a cloud server for processing the processed data. However, as the formats of data generated in different unmanned vehicle operating environments are different, the data received by the cloud server are in different formats as well, preventing the cloud server from consistently analyzing and processing the data generated in different unmanned vehicle operating environments. Moreover, the development of the respective codes for the data structures of the data generated in different unmanned vehicle operating environments to implement the data processing in prior art leads to heavy code developing workloads.

According to the data processing method, apparatus, device and storage medium based on the unmanned vehicle provided in the embodiments of the present disclosure, data generated in different unmanned vehicle operating environments are transformed into data in compliance with the preset data structure according to a data transformation logic corresponding to type information of any unmanned vehicle operating environment. The solution can be applied to different types of unmanned vehicle operating environments, saving the code developing workloads significantly, thereby solving the problem of significant workloads in developing codes in prior art. Moreover, by transforming the data generated in different unmanned vehicle operating environments into data in compliance with the preset data structure, the cloud server can consistently analyze and process various data in compliance with the preset data structure after the such data has been transmitted to the cloud server, thereby solving the technical problem that the cloud server is unable to consistently analyze and process data generated in different unmanned vehicle operating environments because the data is in different formats.

The technical solutions in the present disclosure and how they can solve the technical problems described above are explained in detail in the following with specific embodiments. The following specific embodiments can be recombined with each other, and same or similar concepts and processes may not be repeated in some embodiments.

Figure 1:
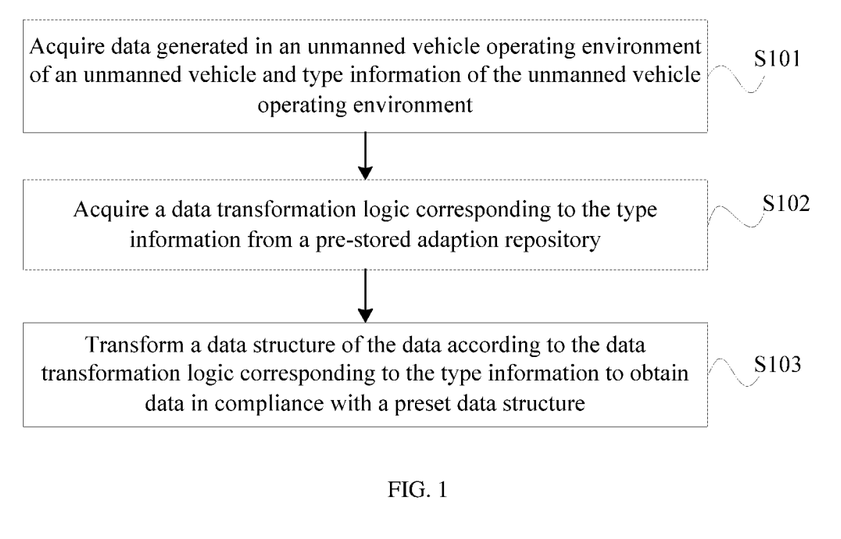
FIG. 1 is a flowchart of a data processing method based on unmanned vehicles provided in an embodiment of the present disclosure.

FIG. 1 is a flowchart of a data processing method based on an unmanned vehicle according to an embodiment of the present disclosure. As shown in FIG. 1, the data processing method based on an unmanned vehicle provided in this embodiment may include:

Step S101: acquire data generated in an unmanned vehicle operating environment of an unmanned vehicle and type information of the unmanned vehicle operating environment.

In this step, a data processing apparatus based on an unmanned vehicle acquires the type information of the unmanned vehicle operating environment of the unmanned vehicle to which the data processing apparatus belongs (used for uniquely indicating the unmanned vehicle operating environment of the unmanned vehicle to which the data processing apparatus based on the unmanned vehicle belongs), and acquires the data generated by the unmanned vehicle in the unmanned vehicle operating environment.

Illustratively, the type information of the unmanned vehicle operating environment related in the embodiment of the present disclosure may include, but not limited to, an identification of the unmanned vehicle operating environment. Certainly, other information that can uniquely identify the unmanned vehicle operating environment is also possible, which is not limited herein.

Illustratively, the data generated in the unmanned vehicle operating environment related in the embodiment of the present disclosure may include, but not limited to: driving data generated during operation of the unmanned vehicle, and status detection data.

In this step, the data processing apparatus based on an unmanned vehicle can acquire data generated by the unmanned vehicle in the unmanned vehicle operating environment through detection components such as sensors in the unmanned vehicle. Certainly, the data generated in the unmanned vehicle operating environment can be acquired through other means, which is not limited herein.

The following section of the present disclosure will introduce possible means of the "acquiring type information of the unmanned vehicle operating environment".

A possible implementation acquires data structure information in the date generated in the unmanned vehicle operating environment. Further, type information corresponding to the data structure information is identified according to a corresponding relationship between preset data structure information and type information to identify the type information of the unmanned vehicle operating environment.

In this embodiment, a corresponding relationship between data structure information and type information is preconfigured in the data processing apparatus based on an unmanned vehicle. For example, the data processing apparatus based on an unmanned vehicle may be preconfigured with a corresponding relationship between data structure information 1 and type information 1, a corresponding relationship between data structure information 2 and type information 2, and a corresponding relationship between data structure information 3 and type information 3.

In this implementation, the data processing apparatus based on an unmanned vehicle acquires the data structure information (such as the data structure information 2) of data generated by the unmanned vehicle to which the data processing apparatus belongs in the unmanned vehicle operating environment. Further, according to a corresponding relationship between the data structure information and the type information (such as the corresponding relationship between the data structure information 1 and the type information 1, the corresponding relationship between the data structure information 2 and the type information 2, and the corresponding relationship between the data structure information 3 and the type information 3), it can be determined that the type information (such as the type information 2) corresponding to the data structure information (such as the data structure information 2) is the type information of the unmanned vehicle operating environment corresponding to the unmanned vehicle to which the data processing apparatus belongs.

In another possible implementation, data structure information of data generated in the unmanned vehicle operating environment is acquired. Further, the data structure information is recognized using a preset recognition model to derive type information of the unmanned vehicle operating environment.

In this embodiment, the data processing apparatus based on an unmanned vehicle is preconfigured with the preset recognition model, where input information to the preset recognition model may be the data structure information, and output information from the preset recognition model may be type information of the unmanned vehicle operating environment.

Illustratively, the preset recognition model involved in an embodiment of the present disclosure may be obtained through training with a large amount of training data, such as data structure training information and its corresponding type training information of the unmanned vehicle operating environment.

In this implementation, the data processing apparatus based on an unmanned vehicle acquires the data structure information of the data generated by the unmanned vehicle to which the data processing apparatus belongs in the unmanned vehicle operating environment. Further, the data processing apparatus based on an unmanned vehicle inputs the data structure information of the data generated by the unmanned vehicle to which the data processing apparatus belongs in the unmanned vehicle operating environment into the preconfigured recognition model for recognition, and derives from the output the type information of the unmanned vehicle operating environment corresponding to the unmanned vehicle to which the data processing apparatus belongs.

Of course, the type information of the unmanned vehicle operating environment can be acquired through other possible means, which is not limited herein.

Step S102: acquire a data transformation logic corresponding to the type information from a pre-stored adaption repository.

In this embodiment, the data processing apparatus based on an unmanned vehicle is preconfigured with an adaption repository, which stores data transformation logics corresponding to different type information, where a data transformation logic can be applied in transforming a data structure of the data generated in the unmanned vehicle operating environment corresponding to the type information, the type information being corresponding to said data transformation logic. A data transformation logic transforms data generated in the unmanned vehicle operating environment corresponding to the type information which, in turn, corresponds to the data transformation logic, into data with a consistent preset data structure.

For example, an adaption repository involved in the embodiment of the present disclosure may store thereon data transformation logic 1 corresponding to type information 1 of an unmanned vehicle operating environment 1 (used for transforming a data structure of data generated in the unmanned vehicle operating environment 1), data transformation logic 2 corresponding to type information 2 of an unmanned vehicle operating environment 2 (used for transforming a data structure of data generated in the unmanned vehicle operating environment 2), and data transformation logic 3 corresponding to type information 3 of an unmanned vehicle operating environment 3 (used for transforming a data structure of data generated in the unmanned vehicle operating environment 3).

In this step, the data processing apparatus based on an unmanned vehicle can determine the data transformation logic (such as the data transformation logic 2) corresponding to the type information of the unmanned vehicle operating environment of the unmanned vehicle to which the data processing apparatus belongs acquired in the step S101 described above (such as the type information 2 of the unmanned vehicle operating environment 2), so that the apparatus can transform the data structure of the data generated by the unmanned vehicle to which the data processing apparatus belongs in the unmanned vehicle operating environment (such as the unmanned vehicle operating environment 2).

Step S103: transform a data structure of the data according to the data transformation logic corresponding to the type information to obtain data in compliance with a preset data structure.

In this step, the data processing apparatus based on an unmanned vehicle may transform, according to the data transformation logic corresponding to the type information of the unmanned vehicle operating environment of the unmanned vehicle to which the data processing apparatus belongs acquired in Step 102 described above, the data structure of the data which is generated by the unmanned vehicle to which the data processing apparatus belongs in the unmanned vehicle operating environment and acquired in the step S101 described above, and obtain the data in compliance with the preset data structure, thus enabling the cloud server to consistently analyze and process the data in compliance with the preset data structure after the data in compliance with the preset data structure has been transmitted to the cloud server.

Illustratively, for data generated in different unmanned vehicle operating environments, the data structures of the obtained data that is in compliance with the preset data structure are the same.

In the embodiment of the present disclosure, data generated in an unmanned vehicle operating environment of the unmanned vehicle and type information of the unmanned vehicle operating environment are acquired, and then data transformation logic corresponding to the type information is acquired from a preset adaption repository. Further, a data structure of the data is transformed to obtain data in compliance with a preset data structure according to the data transformation logic corresponding to the type information. It can be seen that, by transforming data generated in various unmanned vehicle operating environments into data in compliance with the preset data structure according to data transformation logics corresponding to various type information of the unmanned vehicle operating environments and processing the data in compliance with the preset data structures, data processing can be facilitated for different types of unmanned vehicle operating environments, thereby saving the code developing workload significantly and improving the code developing efficiency. Moreover, by transforming the data generated in the unmanned vehicle operating environments into the data in compliance with the preset data structure, the cloud server can consistently analyze and process various data in compliance with the preset data structure after the data in compliance with the preset data structure have been transmitted to the cloud server, so that the data processing efficiency can be improved.

Figure 2:
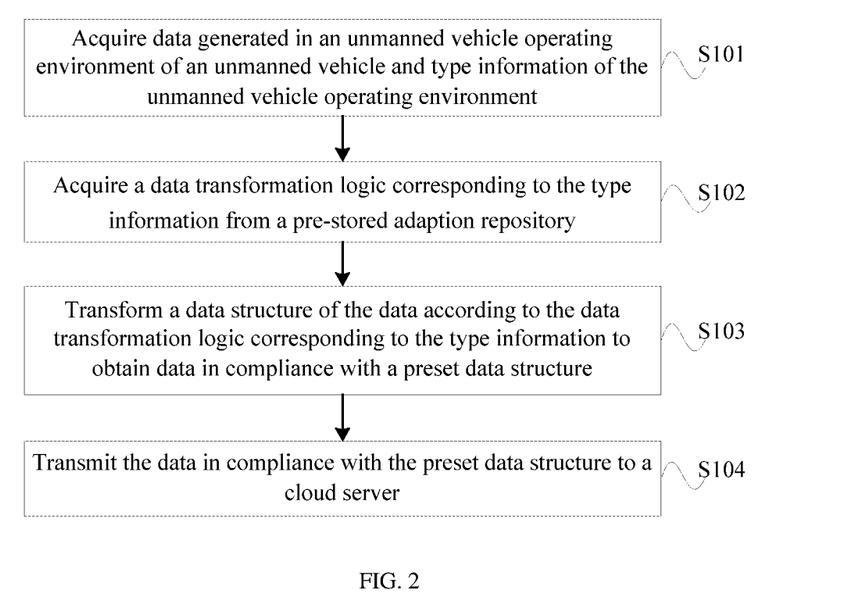
FIG. 2 is a flowchart of a data processing method based on an unmanned vehicle provided in another embodiment of the present disclosure.

FIG. 2 is a flowchart of a data processing method based on an unmanned vehicle provided in another embodiment of the present disclosure. On the basis of the embodiment described above, after the step S103 described above, this embodiment of the present disclosure further includes:

Step S104: transmit the data in compliance with the preset data structure to a cloud server.

In this embodiment, after transforming, according to the data transformation logic corresponding to the type information of the unmanned vehicle operating environment of the unmanned vehicle to which the data processing apparatus belongs, a data structure of the data generated by the unmanned vehicle to which the data processing apparatus belongs in the unmanned vehicle operating environment and obtaining the data in compliance with the preset data structure in the above step S103, the data processing apparatus based on an unmanned vehicle may further transmit the data in compliance with the preset data structure to the cloud server, enabling the cloud server to consistently analyze and process the data in compliance with the preset data structure.

The following section of this embodiment will explain a possible implementation of the "transmit the data in compliance with the preset data structure to the cloud server".

In an implementation, perform data processing to the data in compliance with the preset data structure to derive processed data and then transmit the processed data to the cloud server.

In this embodiment, the data processing apparatus based on an unmanned vehicle performs the data processing (such as compressing and/or encrypting, etc.) to derive the processed data. Illustratively, the data in compliance with the preset data structure is scheduled into parallel threads for the data processing to derive the processed data. Certainly, the data in compliance with the preset data structure can be processed according to other means, which is no limited herein.

Further, the data processing apparatus based on an unmanned vehicle can transmit the processed data to the cloud server, enabling the cloud server to consistently analyze and process the processed data.

In this embodiment of the present disclosure, data generated in different unmanned vehicle operating environments is transformed into data in compliance with a preset data structure, which is then transmitted to the cloud server, so that the cloud server can consistently analyze and process the data in compliance with the preset data structure, thereby improving the data processing efficiency.

Figure 3:
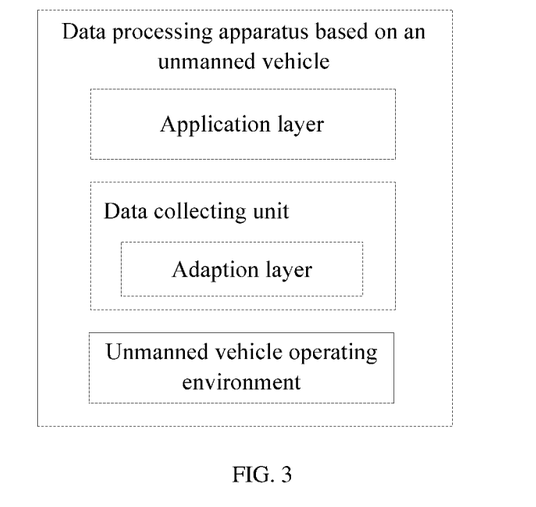
FIG. 3 is a schematic structural diagram of a data processing apparatus based on an unmanned vehicle provided in an embodiment of the present disclosure.

FIG. 3 is a schematic structural diagram of a data processing apparatus based on an unmanned vehicle provided in an embodiment of the present disclosure. On the basis of the embodiment described above, the data processing apparatus based on an unmanned vehicle herein includes, by way of example, an unmanned vehicle operating environment, a data collecting unit (which includes an adaption layer) and an disclosure layer (of course, other components may also be included, which is not limited herein), so as to explain the data processing method based on an unmanned vehicle in the embodiments of the present disclosure.

Illustratively, the adaption layer involved in the embodiment of the present disclosure may include multiple adapters (used for implementing corresponding data transformation logics) corresponding to various type information of different unmanned vehicle operating environments.

With reference to FIG. 3, a method of this embodiment of the present disclosure may include:

a) the adaption layer in the data collecting unit is acquires data generated by an unmanned vehicle to which the adaption layer belongs in an unmanned vehicle operating environment and type information of the unmanned vehicle operating environment of the unmanned vehicle to which the adaption layer belongs.

b) the adapter layer loads a corresponding target adapter, which is further configured to implement a data transformation logic corresponding to the type information of the unmanned vehicle operating environment of the unmanned vehicle to which the adaption layer belongs, according to the type information of the unmanned vehicle operating environment of the unmanned vehicle to which the adaption layer belongs.

c) the adaption layer transforms the data structure of the data generated by the unmanned vehicle to which the adaption layer belongs in the unmanned vehicle operating environment to obtain data in compliance with a preset data structure according to the data transformation logic of the target adapter, and transmit the same to an application layer.

d) the application layer performs data processing on the data in compliance with the preset data structure, and transmits processed data to a cloud server.

In summary, an adaption layer in a data collecting unit of an unmanned vehicle transforms data generated in respective unmanned vehicle operating environments into unified data in compliance with the preset data structure according to a target adapter corresponding to the type information of the unmanned vehicle operating environments of the unmanned vehicle to which the adaption layer belongs, so that the unified data in compliance with the preset data structure can be processed in a way adaptable to various data processing in different unmanned vehicle operating environments, saving code developing workloads significantly, and improving the code developing efficiency. Moreover, the unified data in compliance with the preset data structure is transmitted to the cloud server to help the cloud server to consistently analyze and process various unified data in compliance with the preset data structure, thereby improving the data processing efficiency.

Figure 4:
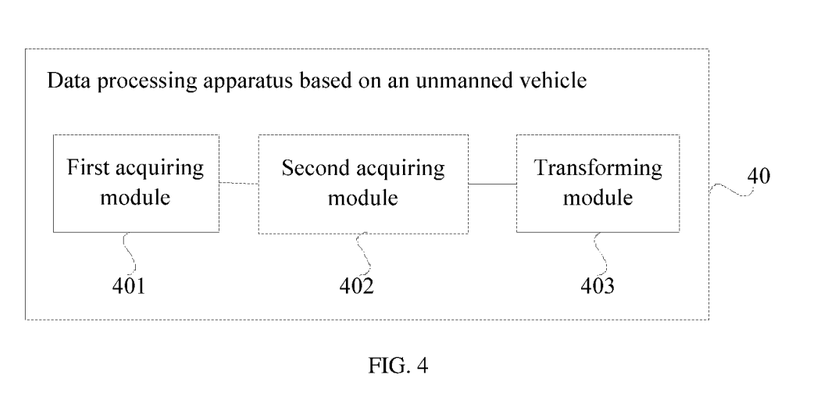
FIG. 4 is a schematic structural diagram of a data processing apparatus based on an unmanned vehicle provided in another embodiment of the present disclosure.

FIG. 4 is a schematic structural diagram of a data processing apparatus based on an unmanned vehicle provided in still another embodiment of the present disclosure. As shown in FIG. 4, the data processing apparatus 40 based on an unmanned vehicle provided in the embodiment of the present disclosure may include: a first acquiring module 401, a second acquiring module 402 and a transforming module 403, where:

the first acquiring module 401 is configured to acquire data generated in an unmanned vehicle operating environment of the unmanned vehicle and type information of the unmanned vehicle operating environment;

the second acquiring module 402 is configured to acquire a data transformation logic corresponding to the type information from a pre-stored adaption repository, wherein the adaption repository stores data transformation logics corresponding to different type information; and the transforming module 403 is configured to transform a data structure of the data according to the data transformation logic corresponding to the type information to obtain data in compliance with a preset data structure.

In a possible implementation, the data processing apparatus 40 based on an unmanned vehicle further includes:

a transmitting module, configured to transmit the data in compliance with the preset data structure to a cloud server.

In a possible implementation, the transmitting module includes:

a processing unit, configured to perform data processing to the data in compliance with the preset data structure to derive processed data; and a transmitting unit, configured to transmit the processed data to a cloud server.

In a possible implementation, the processing unit is specifically configured to:

schedule the data in compliance with the preset data structure into parallel threads for the data processing to derive the processed data.

In a possible implementation, the type information is an identification of the unmanned vehicle operating environment.

In a possible implementation, the first acquiring module 401 includes:

a first acquiring unit, configured to acquire data structure information of the data generated in the unmanned vehicle operating environment;

a determining unit, configured to identify type information corresponding to the data structure information according to a predefined corresponding relationship between data structure information and type information to derive the type information of the unmanned vehicle operating environment.

In a possible implementation, the first acquiring module 401 includes:

a second acquiring unit, configured to acquire data structure information of the data generated in the unmanned vehicle operating environment; and a recognizing unit, configured to recognize the data structure information using a preconfigured recognition model to derive the type information of the unmanned vehicle operating environment.

In a possible implementation, for data generated in different unmanned vehicle operating environments, the data structures of the obtained data that is in compliance with the preset data structure are the same.

The data processing apparatus based on an unmanned vehicle provided in the embodiment of the present disclosure is configured to carry out the technical solution of the data processing method based on an unmanned vehicle in the embodiments of the present disclosure following similar implementation principles and producing similar technical effects, which will not be repeated herein.

Figure 5:
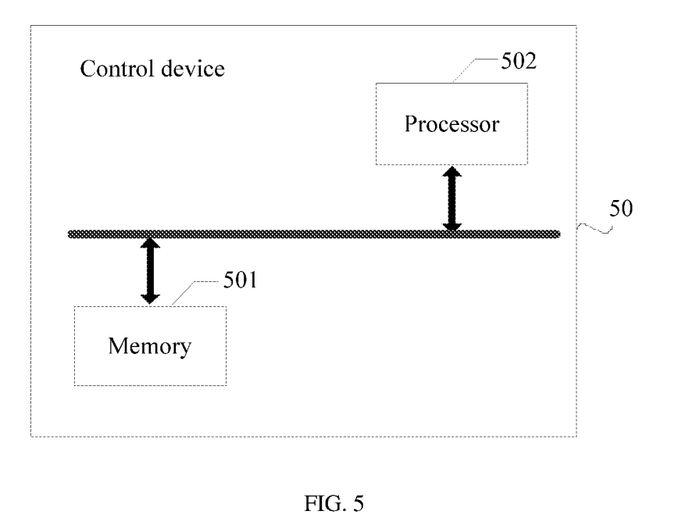
FIG. 5 is a schematic structural diagram of a control device provided in an embodiment of the present disclosure.

FIG. 5 is a schematic structural diagram of a control device provided in an embodiment of the present disclosure. As shown in FIG. 5, a control device provided in an embodiment of the present disclosure may include a memory 501 and a processor 502, wherein the memory 501 is configured to store computer instructions; and the processor 502 is configured to execute the computer instructions stored in the memory 501 to implement the technical solution of the data processing method based on an unmanned vehicle in the embodiment of the present disclosure following similar implementation principles and producing similar technical effects, which will not be repeated herein.

In specific implementations of the foregoing devices, it should be understood that the processor 502 may be a central processing unit (CPU) and may also be other general purpose processors, digital signal processors (DSP), and/or disclosure specific integrated circuits (ASIC). The general purpose processor may be a microprocessor or the processor or any conventional processor or the like. The steps of the method disclosed with reference to the embodiments of the present disclosure may be directly embodied by the execution of the hardware processor or by a combination of hardware and software modules in the processor.

An embodiment of the present disclosure also provides a storage medium, including: a readable storage medium; and computer instructions stored in the readable storage medium, the computer instructions being configured to implement the technical solution of the data processing method based on an unmanned vehicle in the embodiment of the present disclosure following similar implementation principles and producing similar technical effects, which will not be repeated herein.

An embodiment of the present disclosure also provides a chip for executing instructions, the chip being configured to carry out the technical solution of the data processing method based on an unmanned vehicle in the embodiment of the present disclosure following similar implementation principles and producing similar technical effects, which will not be repeated herein.

An embodiment of the present disclosure also provides a program product, which includes a computer program stored in a storage medium, from which at least one processor can read the computer program, enabling the at least one processor to implement the technical solution in the data processing method based on an unmanned vehicle in the embodiment of the present disclosure following similar implementation principles and producing similar technical effects, which will not be repeated herein.

It can be understood by those skilled in the art that, in various embodiments of the present disclosure, the magnitudes of the serial numbers of the above-mentioned processes does not imply their order of execution, and the order of execution of individual processes should be determined by their functions and internal logics, rather than forming any limitation on the implementation process of the embodiments of the present disclosure.

It will be understood by those skilled in the art that all or part of the steps to implement the respective method embodiment described above can be implemented by hardware in relation with programming instructions. The program can be stored in a computer readable storage medium. When being executed, the program executes steps included in the method embodiments described above. The storage medium described above may include: a read-only memory (ROM), a random access memory (RAM), a flash memory, a hard disk, a solid-state hard disk, a magnetic tape, a floppy disk, an optical disc and any combination thereof.

Finally, it should be noted that the above embodiments are used only to illustrate the technical solution of the present disclosure, not to limit it. Although the present disclosure has been described in detail with reference to the above embodiments, those of ordinary skill in the art should understand that modification is still possible for the technical solutions recorded in the foregoing embodiments, or some or all of their technical features may be substituted by their equivalences; and such modifications or substitutions do not divert the essence of the corresponding technical solution away from the scope of the technical solutions of the embodiments of the present disclosure.

What is claimed is:

1. A data processing method based on an unmanned vehicle, which is applicable in the unmanned vehicle, the method comprising:
   acquiring, by a data processing apparatus of the unmanned vehicle, driving data generated in an operating environment set in an unmanned vehicle during operation of the unmanned vehicle and type information of the operating environment, wherein the type information is an identification of the operating environment, there are several different operating environments available for the unmanned vehicle, and driving data generated in the different operating environments are in different formats, wherein the driving data is generated by detection components of the unmanned vehicle and the operating environment comprises an operating system of the unmanned vehicle;
   acquiring, by the data processing apparatus, a data transformation logic corresponding to the type information from a pre-stored adaption repository, wherein the pre-stored adaption repository stores data transformation logics corresponding to different type information; and
   transforming, by the data processing apparatus, a data structure of the driving data generated in the operating environment according to the data transformation logic corresponding to the type information to obtain unified data in compliance with a preset data structure, wherein data structures of obtained unified data in compliance with the preset data structure are identical for driving data generated in the different operating environments;
   performing, by the data processing apparatus, compressing to the unified data in compliance with the preset data structure to derive compressed data; and
   transmitting, by the data processing apparatus, the compressed data to a cloud server, and enabling the cloud server to simulate and recover a driving scenario of the unmanned vehicle based on received compressed data;
   wherein the acquiring type information of the operating environment comprises:
   acquiring data structure information of the driving data generated in the operating environment; and
   identifying type information corresponding to the data structure information according to a predefined corresponding relationship between data structure information and type information to derive the type information of the operating environment; or
   recognizing the data structure information using a preconfigured recognition model to derive the type information of the operating environment, the preconfigured recognition model trained with data structure training information and its corresponding type training information of the unmanned vehicle operating environment.

2. The method according to claim 1, wherein the performing compressing to the unified data in compliance with the preset data structure to derive the compressed data comprises: scheduling the unified data in compliance with the preset data structure into parallel threads for the compressing to derive the compressed data.

3. A data processing apparatus based on an unmanned vehicle, which is applicable in the unmanned vehicle, the apparatus comprising:
   a memory and a processor,
   wherein the memory is configured to store computer instructions, the processor is configured to execute instructions stored in the memory to:
   acquire driving data generated in an operating environment set in an unmanned vehicle during operation of the unmanned vehicle and type information of the operating environment, wherein the type information is an identification of the operating environment, there are several different operating environments available for the unmanned vehicle, and driving data generated in the different operating environments are in different formats, wherein the driving data is generated by detection components of the unmanned vehicle and the operating environment comprises an operating system of the unmanned vehicle;
   acquire a data transformation logic corresponding to the type information from a pre-stored adaption repository, wherein the pre-stored adaption repository stores data transformation logics corresponding to different type information; and
   transform a data structure of the driving data generated in the operating environment according to the data transformation logic corresponding to the type information to obtain unified data in compliance with a preset data structure, wherein data structures of obtained unified data in compliance with the preset data structure are identical for driving data generated in the different operating environments;
   perform compressing to the unified data in compliance with the preset data structure to derive compressed data; and
   transmit the compressed data to a cloud server, and enable the cloud server to simulate and recover a driving scenario of the unmanned vehicle based on received compressed data;
   wherein the processor is configured to execute the instructions to:
   acquire data structure information of the driving data generated in the operating environment; and
   identify type information corresponding to the data structure information according to a predefined corresponding relationship between data structure information and type information to derive the type information of the operating environment; or
   recognize the data structure information using a preconfigured recognition model to derive the type information of the operating environment, the preconfigured recognition model trained with data structure training information and its corresponding type training information of the unmanned vehicle operating environment.

4. The apparatus according to claim 3, wherein the processor is configured to execute the instructions to:
   schedule the data in compliance with the preset data structure into parallel threads for the compressing to derive the compressed data.

5. A non-volatile storage medium, comprising: a non-transitory computer readable storage medium; and computer instructions stored in the non-transitory computer readable storage medium, the computer instructions being configured to implement the data processing method based on an unmanned vehicle, which is applicable in the unmanned vehicle, the method comprising:
   acquiring, by a data processing apparatus of the unmanned vehicle, driving data generated in an operating environment set in an unmanned vehicle during operation of the unmanned vehicle and type information of the operating environment, wherein the type information is an identification of the operating environment, there are several different operating environments available for the unmanned vehicle, and driving data generated in the different operating environments are in different formats, wherein the driving data is generated by detection components of the unmanned vehicle and the operating environment comprises an operating system of the unmanned vehicle;

acquiring, by the data processing apparatus, a data transformation logic corresponding to the type information from a pre-stored adaption repository, wherein the pre-stored adaption repository stores data transformation logics corresponding to different type information; and transforming, by the data processing apparatus, a data structure of the driving data generated in the operating environment according to the data transformation logic corresponding to the type information to obtain unified data in compliance with a preset data structure, wherein data structures of obtained unified data in compliance with the preset data structure are identical for driving data generated in the different operating environments;

performing, by the data processing apparatus, compressing to the unified data in compliance with the preset data structure to derive compressed data; and transmitting, by the data processing apparatus, the compressed data to a cloud server, and enabling the cloud server to simulate and recover a driving scenario of the unmanned vehicle based on received compressed data;

wherein the acquiring type information of the operating environment comprises:

acquiring data structure information of the driving data generated in the operating environment; and identifying type information corresponding to the data structure information according to a predefined corresponding relationship between data structure information and type information to derive the type information of the operating environment; or recognizing the data structure information using a preconfigured recognition model to derive the type information of the operating environment, the preconfigured recognition model trained with data structure training information and its corresponding type training information of the unmanned vehicle operating environment.

* * * * *